United States Patent
Taivalsaari et al.

(10) Patent No.: US 7,603,665 B2
(45) Date of Patent: Oct. 13, 2009

(54) METHOD AND APPARATUS FOR LOADING RELOCATABLE IN-PLACE EXECUTABLE FILES IN A VIRTUAL MACHINE

(75) Inventors: Antero K. P. Taivalsaari, Siivikkala (FI); William F. Pittore, Lexington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 817 days.

(21) Appl. No.: 10/880,786

(22) Filed: Jun. 29, 2004

(65) Prior Publication Data

US 2005/0289285 A1    Dec. 29, 2005

(51) Int. Cl.
   *G06F 9/44* (2006.01)
(52) U.S. Cl. .................................. 717/162; 717/165
(58) Field of Classification Search ......... 717/162–167; 718/1; 715/500
   See application file for complete search history.

(56) References Cited

U.S. PATENT DOCUMENTS

| | | | | |
|---|---|---|---|---|
| 5,799,207 | A * | 8/1998 | Wang et al. | 710/38 |
| 6,442,660 | B1 * | 8/2002 | Henerlau et al. | 711/165 |
| 6,810,519 | B1 * | 10/2004 | Hicks | 717/166 |
| 7,028,251 | B2 * | 4/2006 | Draper | 715/500.1 |
| 2003/0033441 | A1 * | 2/2003 | Forin et al. | 709/315 |
| 2004/0088701 | A1 | 5/2004 | Hatalkar | |
| 2005/0132179 | A1 * | 6/2005 | Glaum et al. | 713/1 |
| 2005/0289543 | A1 * | 12/2005 | Taivalsaari et al. | 718/1 |

FOREIGN PATENT DOCUMENTS

WO    9627158 A1    9/1996

OTHER PUBLICATIONS

Levine "Linkers & Loaders", 2000, Academic Press, pp. 149-163.*
Linus Torvalds et al., "Excerpt from the Linux Kernel", version 2.6.7, files fs/binfmt_flat.c and fs/exec.c, Internet Publication, Jun. 16, 2004, pp. 1-28, retrieved from the internet: URL http://www.kernel.org/pub/linux/kernel/v2.6/linux-2. 6. 7.tar.g>, pp. 12-14, pp. 21-26.

* cited by examiner

*Primary Examiner*—Lewis A Bullock, Jr.
*Assistant Examiner*—Jason Mitchell
(74) *Attorney, Agent, or Firm*—Park, Vaughan & Fleming, LLP

(57) ABSTRACT

One embodiment of the present invention provides a system that facilitates loading of an in-place executable file into a virtual machine. The system operates by loading the in-place executable file into the virtual machine, where the in-place executable file contains internal pointers that point to memory locations within the in-place executable file, and a target memory address that specifies a target location in memory where the in-place executable file is configured to be loaded. The system then determines an actual memory address at which the in-place executable file is actually loaded. If the actual memory address and the target memory address are different, the system generates an offset value, which is the difference between the actual memory address and the target memory address. Finally, the system adjusts each internal pointer within the in-place executable file by the offset value so that the internal pointers point to intended locations inside the in-place executable file.

30 Claims, 2 Drawing Sheets

METHOD AND APPARATUS FOR LOADING RELOCATABLE IN-PLACE EXECUTABLE FILES IN A VIRTUAL MACHINE

BACKGROUND

1. Field of the Invention

The present invention relates to computer systems that support virtual machines. More specifically, the present invention relates to a method and an apparatus that facilitates loading relocatable in-place executable files in a virtual machine.

2. Related Art

The Java 2 Platform, Micro Edition (J2ME™), has become very popular in the wireless device space. Motorola, Nokia, NTT DoCoMo, RIM, Siemens, and many other key players in the wireless device industry have recently started shipping J2ME-enabled devices in very high volume. It has been estimated that over 200 million J2ME-enabled mobile phones were shipped in 2003 alone.

However, in spite of the success of the J2ME platform, significant challenges for Java™ technology remain in the memory-constrained device space. One major limiting factor in J2ME application development is application size. With the deployment of more significant J2ME applications in mobile devices, J2ME application downloads will consume an increasingly large amount of wireless network bandwidth. Moreover, the runtime dynamic memory costs and application startup costs associated with anything but small J2ME applications are still excessive for most mass-market consumer devices, as well as for serious mobile systems software development in the Java programming language.

Various techniques can be used to optimize the memory consumption and application startup costs of a Java Virtual Machine (JVM). One of the most promising approaches for dramatically reducing the memory consumption and application startup time of a JVM is a technique called "in-place execution."

In a Java virtual machine that supports in-place execution, the standard Java class file format is replaced with a representation that can be used directly as runtime structures for the virtual machine, without the conventional and costly class loading process. Static data structures, such as classes, method tables, field tables, exception handlers, and symbols, are never actually loaded into the virtual machine. Instead, they are accessed directly from the static representation. In mobile devices, where the static representation can be kept in flash memory or ROM, this can result in dramatic RAM consumption savings, as well as battery conservation, typically on the order of five-fold to ten-fold. The static size of these applications is typically much smaller than with regular Java class files or JAR files. This can be accomplished without any loss of symbolic information or dynamic linkability of Java applications.

Unfortunately, in-place execution has disadvantages when it comes to execution speed. For example, since in-place executable code is immutable, various commonly used runtime optimizations that depend on the ability to modify bytecodes at runtime cannot be used. Moreover, since in-place executable files (henceforth referred to as "IPE files" or IPEFs) are intended to be portable and easily relocatable in memory, all the references in the files must be offsets or symbolic references rather than pointers. This introduces additional levels of indirection at runtime, which slows down execution speed.

Symbolic references (i.e., references that are "by name" rather than by pointer or offset) are especially problematic, since resolving a symbolic reference typically necessitates a costly symbolic lookup (e.g., a hashtable lookup using a string-based search key). Symbolic references are frequently needed in IPEFs, for instance, when referring to data structures or functions that are already assumed to be present on the target device when the IPEF is being installed on the target device.

Because of these problems, in-place execution has not yet been widely utilized in Java Virtual Machines, even though such technology would otherwise be ideal for mobile phones and other typical target devices of the Java 2 Platform, Micro Edition.

Hence, what is needed is a method and an apparatus that facilitates in-place execution without the problems listed above.

SUMMARY

One embodiment of the present invention provides a system that facilitates loading of an in-place executable file into a virtual machine. The system operates by loading the in-place executable file into the virtual machine, where the in-place executable file contains internal pointers that point to memory locations within the in-place executable file, and a target memory address that specifies a target location in memory where the in-place executable file is configured to be loaded. The system then determines an actual memory address at which the in-place executable file is actually loaded. If the actual memory address and the target memory address are different, the system generates an offset value, which is the difference between the actual memory address and the target memory address. Finally, the system adjusts each internal pointer within the in-place executable file by the offset value so that the internal pointers point to intended locations inside the in-place executable file.

In a variation on this embodiment, the target memory address is located in a header of the in-place executable file.

In a variation on this embodiment, the in-place executable file includes a relocation table that identifies the locations of internal pointers within the in-place executable file.

In a further variation, the system loads the relocation table by retrieving a pointer to the relocation table from a header of the in-place executable file. Upon retrieving the pointer, the system uses the pointer to access the relocation table.

In a further variation, after adjusting each internal pointer, the system reclaims the memory occupied by the relocation table.

In a further variation, after adjusting each internal pointer, the system writes the in-place executable file back (with adjusted internal pointers) to a storage medium without the relocation table. The system also sets a relocation bit in the in-place executable file header that indicates that relocation has already taken place. During subsequent executions of the in-place executable file, the system can access the in-place executable file (with adjusted pointers) from the storage medium and can thereby avoid adjusting the pointers.

In a further variation, the relocation table is structured as a list of offset ranges, where each offset range includes a starting address and an ending address of a contiguous set of internal pointers within the in-place executable file.

In a further variation, the relocation table is structured as a bitmap, where each bit corresponds to a word in the in-place executable file. A set bit indicates that the word contains an internal pointer. In a further variation, the bitmap is compressed to further reduce memory consumption.

In a further variation, the relocation table is structured as a packed list. Each entry in the packed list includes a starting offset (relative to a starting offset of a previous entry) of a range of internal pointers in the in-place executable file and the number of contiguously located internal pointers beginning at the starting offset.

In a variation on this embodiment, the virtual machine is a platform-independent virtual machine.

In a further variation, the virtual machine is a Java Virtual Machine.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and does not include computer instruction signals embodied in a transmission medium.

Memory-Constrained Computing Device

Figure 1:
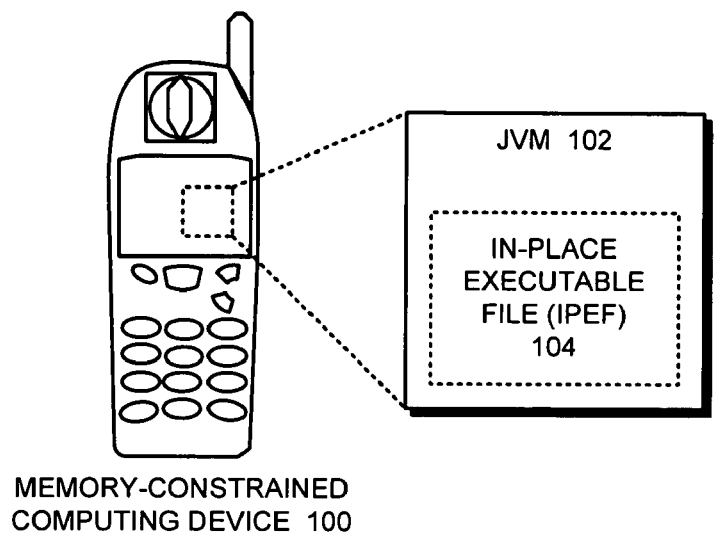
FIG. 1 illustrates a memory-constrained computing device in accordance with an embodiment of the present invention.

FIG. 1 illustrates a memory-constrained computing device 100 in accordance with an embodiment of the present invention. Memory-constrained computing device 100 can include any type of computing device, including, but not limited to, a cell phone, a computer system based on a microprocessor, a digital signal processor, a portable computing device, a personal organizer, a device controller, and a computational engine within an appliance. Memory-constrained computing device 100 contains Java Virtual Machine (JVM) 102, which in turn supports execution of In-Place Executable File (IPEF) 104. (The terms JAVA, JVM and JAVA VIRTUAL MACHINE are trademarks of SUN Microsystems, Inc. of Santa Clara, Calif.) Note that JVM 102 could be any type of platform-independent virtual machine, and is not meant to be limited to a Java Virtual Machine.

In-Place Executable File

Figure 2:
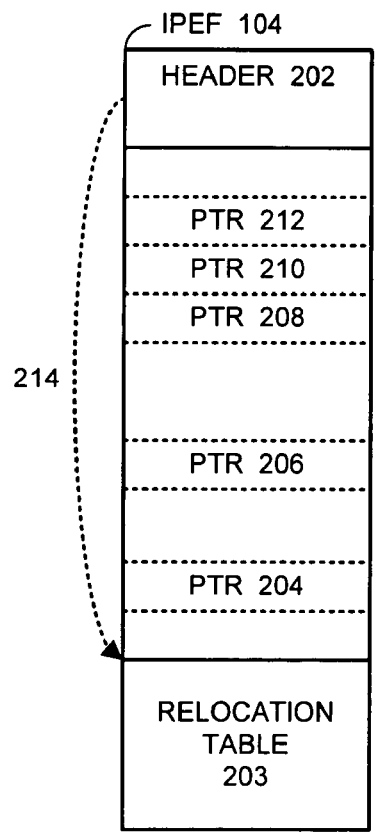
FIG. 2 illustrates an in-place executable file in accordance with an embodiment of the present invention.

FIG. 2 illustrates an in-place executable file 104 in accordance with an embodiment of the present invention. IPEF 104 includes header 202, relocation table 203, and a plurality of Internal Pointers (IP) 204-212. In a traditional IPEF, all references to locations inside the IPEF are based on offsets rather than pointers. By using offsets, the contents of the IPEF can be location-independent, and the IPEF can be flexibly loaded into any location in memory (and later relocated to another memory location if necessary).

The use of offsets, while beneficial from the viewpoint of relocation, can increase the performance overhead due to the additional level of indirection. Offset-based data structures are particularly problematic in high-performance virtual machines, where the virtual machine utilizes machine code to access various data structures efficiently. In typical computer architectures, machine instructions are designed to handle pointer-based data structures more efficiently than offset-based data structures.

The increased performance overhead can be avoided by using pointers instead of offsets. However, if pointers are used, the contents of the IPEF are bound to a certain memory location and the IPEF can be loaded only into a fixed location in memory. This is problematic, considering that the target memory location on the target device may already be in use or is not available. For example, on a small embedded target device, such as memory-constrained computing device 100, the amount of memory is probably significantly smaller than on the computer in which IPEF 104 was originally created. Hence, the requested location might not be available.

To eliminate this problem, relocation table 203 has been added to IPEF 104. Relocation table 203 is an offset map that contains information about the internal pointers 204-212 in IPEF 104, allowing internal pointers 204-212 to be adjusted upon loading IPEF 104 into memory.

In one embodiment of the present invention, relocation table 203 includes "offset ranges" that record the locations of internal pointers 204-212 in IPEF 104. In this embodiment, each entry in relocation table 203 stores information about a starting location and ending location of an area in IPEF 104 that contains internal pointers. This embodiment is particularly well-suited to situations in which the number of pointers in IPEF 104 is fairly low and/or the internal pointers are located in a few contiguous areas in IPEF 104.

In a variation on embodiment, relocation table 203 is stored as a vector of bits (also known as a bitmap), wherein each bit represents the location of a single internal pointer in IPEF 104. This embodiment is well-suited to situations in which IPEF 104 contains a large number of internal pointers that are randomly distributed in IPEF 104. Note that the bitmap can optionally be compressed to further reduce memory consumption.

In another variation on this embodiment, a packed representation is used, wherein each entry in relocation table 203 contains both the starting offset of an area where a range of internal pointers starts (relative to the starting offset of the previous entry in relocation table 203), and the number of contiguously located pointers starting from that location. The starting offset of each new entry in relocation table 203 is represented relative to the previous entry. This allows small numbers (for example, numbers that are small enough to fit into 16 bits) to be used to represent starting offsets.

In all of the above-mentioned embodiments, relocation table 203 is not needed after relocation has been performed. Hence, the memory occupied by relocation table 203 can be returned back to the operating system.

Furthermore, in one embodiment of the present invention, once IPEF 104 has been relocated, IPEF 104 can optionally be written back to the storage medium in the relocated state. In this embodiment, a flag can be set in the header of IPEF 104 so that on subsequent executions, relocation will not take place.

Loading an In-Place Executable File

Figure 3:
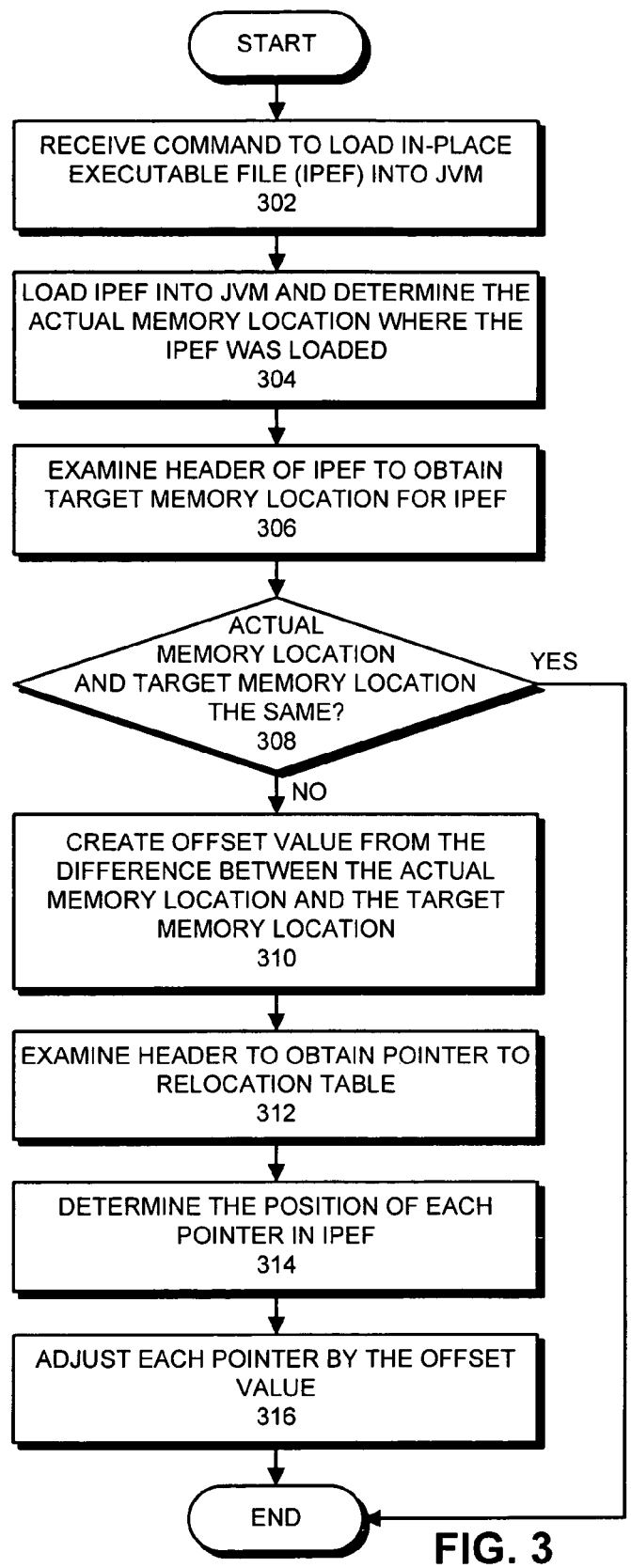
FIG. 3 presents a flowchart illustrating the process of loading an in-place executable file in accordance with an embodiment of the present invention.

FIG. 3 presents a flowchart illustrating the process of loading IPEF 104 in accordance with an embodiment of the present invention. The system starts by receiving a command to load IPEF 104 into JVM 102 (step 302). In response to this command, the system loads IPEF 104 into JVM 102 and determines the actual memory location where IPEF 104 was loaded (step 304). The system also examines header 202 to obtain the target memory location where IPEF 104 is configured to be loaded (step 306). Next, the system compares the actual memory location with the target memory location (step 308). If the target memory location is the same as the actual memory location, the system executes IPEF 104.

However, if the target memory location is different than the actual memory location, the system determines the difference between the target memory location and the actual memory location and creates an offset value (step 310). The system then examines the header of IPEF 104 to obtain pointer 214, which points to the location of relocation table 203 (step 312). Once the system determines the location of relocation table 203, the system uses relocation table 203 to determine the position of each pointer within IPEF 104 (step 314). Finally, the system adjusts each pointer in IPEF 104 by the offset value (step 316). Note that once the pointers have been adjusted, the system may remove relocation table 203 to reclaim memory for use by other system processes.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for loading an in-place executable file into a virtual machine, comprising:
    loading the in-place executable file into the virtual machine, wherein the in-place executable file contains internal pointers that point to memory locations within the in-place executable file, and a target memory address that specifies a target location in memory where the in-place executable file is configured to be loaded;
    determining an actual memory address at which the in-place executable file is actually loaded;
    if the actual memory address and the target memory address are different,
        generating an offset value, which is the difference between the actual memory address and the target memory address, and
        adjusting each internal pointer within the in-place executable file by the offset value so that the internal pointers point to intended locations inside the in-place executable file;
    wherein the in-place executable file includes a relocation table that identifies the locations of internal pointers within the in-place executable file, wherein the relocation table is structured as a list of offset ranges, wherein each offset range includes a starting address and an ending address of a contiguous set of internal pointers within the in-place executable file; and
    wherein the relocation table is removed from the in-place executable file when the in-place executable file is loaded into the virtual machine.

2. The method of claim 1, wherein the target memory address is located in a header of the in-place executable file.

3. The method of claim 1, wherein loading the relocation table involves:
    retrieving a pointer to the relocation table from a header of the in-place executable file; and
    using the pointer to access the relocation table.

4. The method of claim 1, wherein after adjusting each internal pointer, the method further comprises reclaiming the memory occupied by the relocation table.

5. The method of claim 1, wherein after adjusting each internal pointer, the method further comprises:
    writing the in-place executable file back, with adjusted internal pointers, to the target location without the relocation table; and
    setting a relocation bit in the in-place executable file header that indicates that relocation has already taken place;
    whereby subsequent executions of the in-place executable file can access the in-place executable file, with adjusted pointers, from the storage medium and can thereby avoid adjusting the pointers.

6. The method of claim 1, wherein the relocation table is structured as a bitmap, wherein each bit corresponds to a word in the in-place executable file, wherein a set bit indicates that the word contains an internal pointer.

7. The method of claim 6, wherein the bitmap is compressed to further reduce memory consumption.

8. The method of claim 1, wherein the relocation table is structured as a packed list, wherein the ending address of the contiguous set of internal pointers is indicated as an offset representing the number of contiguously located internal pointers.

9. The method of claim 1, wherein the virtual machine is a platform-independent virtual machine.

10. The method of claim 9, wherein the virtual machine is a Java Virtual Machine.

11. A computer-readable storage medium storing instructions that when executed by a computer cause the computer to perform a method for loading an in-place executable file into a virtual machine, the method comprising:
    loading the in-place executable file into the virtual machine, wherein the in-place executable file contains internal pointers that point to memory locations within the in-place executable file, and a target memory address that specifies a target location in memory where the in-place executable file is configured to be loaded;
    determining an actual memory address at which the in-place executable file is actually loaded;
    if the actual memory address and the target memory address are different,
        generating an offset value, which is the difference between the actual memory address and the target memory address, and
    adjusting each internal pointer within the in-place executable file by the offset value so that the internal pointers point to intended locations inside the in-place executable file;
    wherein the in-place executable file includes a relocation table that identifies the locations of internal pointers within the in-place executable file, wherein the relocation table is structured as a list of offset ranges, wherein each offset range includes a starting address and an ending address of a contiguous set of internal pointers within the in-place executable file; and
        wherein the relocation table is removed from the in-place executable file when the in-place executable file is loaded into the virtual machine.

12. The computer-readable storage medium of claim 11, wherein the target memory address is located in a header of the in-place executable file.

13. The computer-readable storage medium of claim 11, wherein loading the relocation table involves:
   retrieving a pointer to the relocation table from a header of the in-place executable file; and
   using the pointer to access the relocation table.

14. The computer-readable storage medium of claim 11, wherein after adjusting each internal pointer, the method further comprises reclaiming the memory occupied by the relocation table.

15. The computer-readable storage medium of claim 11, wherein after adjusting each internal pointer, the method further comprises:
   writing the in-place executable file back, with adjusted internal pointers, to the target location without the relocation table; and
   setting a relocation bit in the in-place executable file header that indicates that relocation has already taken place;
   whereby subsequent executions of the in-place executable file can access the in-place executable file, with adjusted pointers, from the storage medium and can thereby avoid adjusting the pointers.

16. The computer-readable storage medium of claim 11, wherein the relocation table is structured as a bitmap, wherein each bit corresponds to a word in the in-place executable file, wherein a set bit indicates that the word contains an internal pointer.

17. The computer-readable storage medium of claim 16, wherein the bitmap is compressed to further reduce memory consumption.

18. The computer-readable storage medium of claim 11, wherein the relocation table is structured as a packed list, wherein the ending address of the contiguous set of internal pointers is indicated as an offset representing the number of contiguously located internal pointers.

19. The computer-readable storage medium of claim 11, wherein the virtual machine is a platform-independent virtual machine.

20. The computer-readable storage medium of claim 19, wherein the virtual machine is a Java Virtual Machine.

21. An apparatus having a processor, wherein the apparatus is configured for loading an in-place executable file into a virtual machine, comprising:
   a loading mechanism configured to load the in-place executable file into the virtual machine, wherein the in-place executable file contains internal pointers that point to memory locations within the in-place executable file, and a target memory address that specifies a target location in memory where the in-place executable file is configured to be loaded;
   a determination mechanism configured to determine an actual memory address at which the in-place executable file is actually loaded;
   an offset mechanism configured to generate an offset value, which is the difference between the actual memory address and the target memory address, if the actual memory address and the target memory address are different; and
   an adjustment mechanism configured to adjust each internal pointer within the in-place executable file by the offset value so that the internal pointers point to intended locations inside the in-place executable file, if the actual memory address and the target memory address are different;
   wherein the in-place executable file includes a relocation table that identifies the locations of internal pointers within the in-place executable file, wherein the relocation table is structured as a list of offset ranges, wherein each offset range includes a starting address and an ending address of a contiguous set of internal pointers within the in-place executable file; and
   wherein the relocation table is removed from the in-place executable file when the in-place executable file is loaded into the virtual machine.

22. The apparatus of claim 21, wherein the target memory address is located in a header of the in-place executable file.

23. The apparatus of claim 21, further comprising:
   a retrieval mechanism configured to retrieve a pointer to the relocation table from a header of the in-place executable file; and
   an access mechanism configured to use the pointer to access the relocation table.

24. The apparatus of claim 21, further comprising a memory reclamation mechanism configured to reclaim the memory occupied by the relocation table, after adjusting each internal pointer.

25. The apparatus of claim 21, further comprising:
   a write mechanism configured to write the in-place executable file back, with adjusted internal pointers, to the target location without the relocation table, after adjusting each internal pointer;
   a bit setting mechanism configured to set a relocation bit in the in-place executable file header that indicates that relocation has already taken place, after adjusting each internal pointer; and
   whereby during subsequent executions of the in-place executable file, the apparatus can access the in-place executable file, with adjusted pointers, from the storage medium and can thereby avoid adjusting the pointers.

26. The apparatus of claim 21, wherein the relocation table is structured as a bitmap, wherein each bit corresponds to a word in the in-place executable file, wherein a set bit indicates that the word contains an internal pointer.

27. The apparatus of claim 26, wherein the bitmap is compressed to further reduce memory consumption.

28. The apparatus of claim 21, wherein the relocation table is structured as a packed list, wherein the ending address of the contiguous set of internal pointers is indicated as an offset representing the number of contiguously located internal pointers.

29. The apparatus of claim 21, wherein the virtual machine is a platform-independent virtual machine.

30. The apparatus of claim 29, wherein the virtual machine is a Java Virtual Machine.

* * * * *

UNITED STATES PATENT AND TRADEMARK OFFICE
CERTIFICATE OF CORRECTION

PATENT NO.       : 7,603,665 B2                                   Page 1 of 1
APPLICATION NO. : 10/880786
DATED            : October 13, 2009
INVENTOR(S)      : Taivalsaari et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1466 days.

Signed and Sealed this

Fifth Day of October, 2010

David J. Kappos
*Director of the United States Patent and Trademark Office*